United States Patent
Hsiang (10) Patent No.: US 11,202,073 B2
(45) Date of Patent: Dec. 14, 2021

(54) METHODS AND APPARATUSES OF QUANTIZATION SCALING OF TRANSFORM COEFFICIENTS IN VIDEO CODING SYSTEM

(71) Applicant: MEDIATEK INC., Hsinchu (TW)

(72) Inventor: Shih-Ta Hsiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/277,002

(22) PCT Filed: Sep. 2, 2019

(86) PCT No.: PCT/CN2019/103943
§ 371 (c)(1),
(2) Date: Mar. 17, 2021

(87) PCT Pub. No.: WO2020/057359
PCT Pub. Date: Mar. 26, 2020

(65) Prior Publication Data
US 2021/0321105 A1    Oct. 14, 2021

Related U.S. Application Data

(60) Provisional application No. 62/733,100, filed on Sep. 19, 2018.

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/176* (2014.11); *H04N 19/18* (2014.11);
(Continued)

(58) Field of Classification Search
None
See application file for complete search history.

(56) References Cited

U.S. PATENT DOCUMENTS

| 10,405,000 B2 | 9/2019 | Kao et al. |
| 2013/0114688 A1 | 5/2013 | Kerofsky et al. |
| 2016/0255346 A1 | 9/2016 | Sato |

FOREIGN PATENT DOCUMENTS

| CN | 106028032 A | 10/2016 |
| CN | 107211146 A | 9/2017 |

(Continued)

OTHER PUBLICATIONS

Brass et al., "Versatile Video Coding (Draft 2)," Joint Video Expert Team (JVET) of ITU-T VCEG (Q6/16) and ISO/IEC MPEG (JTC 1/SC 29/WG 11), Doc. JVET-K1001_v5, 11th Meeting: Ljubljana, SI, Jul. 10-18, 2018.*

(Continued)

*Primary Examiner* — Michael J Hess
(74) *Attorney, Agent, or Firm* — McClure, Qualey & Rodack, LLP (57) ABSTRACT

Processing methods and apparatuses for video data comprise receiving input data associated with a current transform block in a current video picture, determining if a size of the current transform block is a power of 4, determining a normalized quantization or dequantization scaling factor, generating transform coefficient levels by applying a quantization processing to scaled transform coefficients in the current transform block or generating scaled transform coefficients by applying an inverse quantization processing to transform coefficient levels in the current transform block, and encoding or decoding the current transform block. The quantization processing comprises scaling the scaled transform coefficients by the normalized quantization scaling (Continued)

factor and the inverse quantization processing comprises scaling the transform coefficient levels by the normalized dequantization scaling factor.

15 Claims, 4 Drawing Sheets

(51) Int. Cl.
*H04N 19/18* (2014.01)
*H04N 19/60* (2014.01)
*H04N 19/96* (2014.01)
*H04N 19/119* (2014.01)

(52) U.S. Cl.
CPC ......... *H04N 19/649* (2014.11); *H04N 19/119* (2014.11); *H04N 19/96* (2014.11)

(56) References Cited

FOREIGN PATENT DOCUMENTS

KR  10-2014-0004018 A  1/2014
WO  2017/138352 A1  8/2017

OTHER PUBLICATIONS

International Search Report and Written Opinion dated Nov. 27, 2019, issued in application No. PCT/CN2019/103943.
Chinese language office action dated Nov. 3, 2020, issued in application No. TW 108133647.

* cited by examiner

Fig. 1

MxM​​​​​​​​​​M/2xM​​​​​​​​​​MxM/2​​​​​​​​​​M/2xM/2

M/4xM (L)​​​​​​​​​​M/4xM (R)​​​​​​​​​​MxM/4 (U)​​​​​​​​​​MxM/4 (D)

METHODS AND APPARATUSES OF QUANTIZATION SCALING OF TRANSFORM COEFFICIENTS IN VIDEO CODING SYSTEM

CROSS REFERENCE TO RELATED APPLICATIONS

The present invention claims priority to U.S. Provisional Patent Application, Ser. No. 62/733,100, filed on Sep. 19, 2018, entitled "Methods and apparatus for quantization of transform coefficients". The U.S. Provisional Patent Application is hereby incorporated by reference in its entirety.

FIELD OF THE INVENTION

The present invention relates to video data processing methods and apparatuses for video encoding or video decoding. In particular, the present invention relates to quantization scaling of transform coefficients for both square and non-square blocks.

BACKGROUND AND RELATED ART

Figure 1:
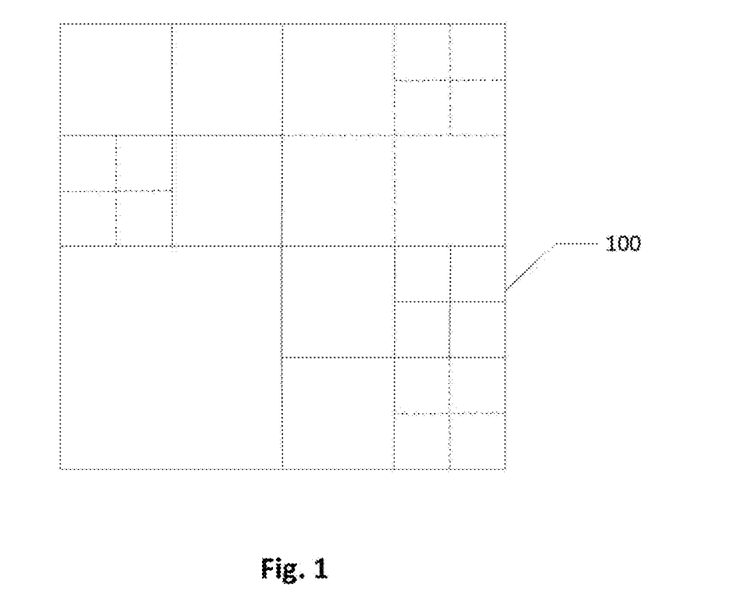
FIG. 1 illustrates an exemplary coding tree for splitting a Coding Tree Unit (CTU) into Coding Units (CUs) and splitting each CU into one or more Transform Units (TUs) according to quadtree splitting defined in the HEVC standard.

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree (QT) partitioning method to adapt to various local motion and texture characteristics. An example of the quadtree block partitioning structure for splitting a CTU into multiple CUs is illustrated in FIG. 1, where the solid lines indicate CU boundaries in CTU 100.

Figure 2:
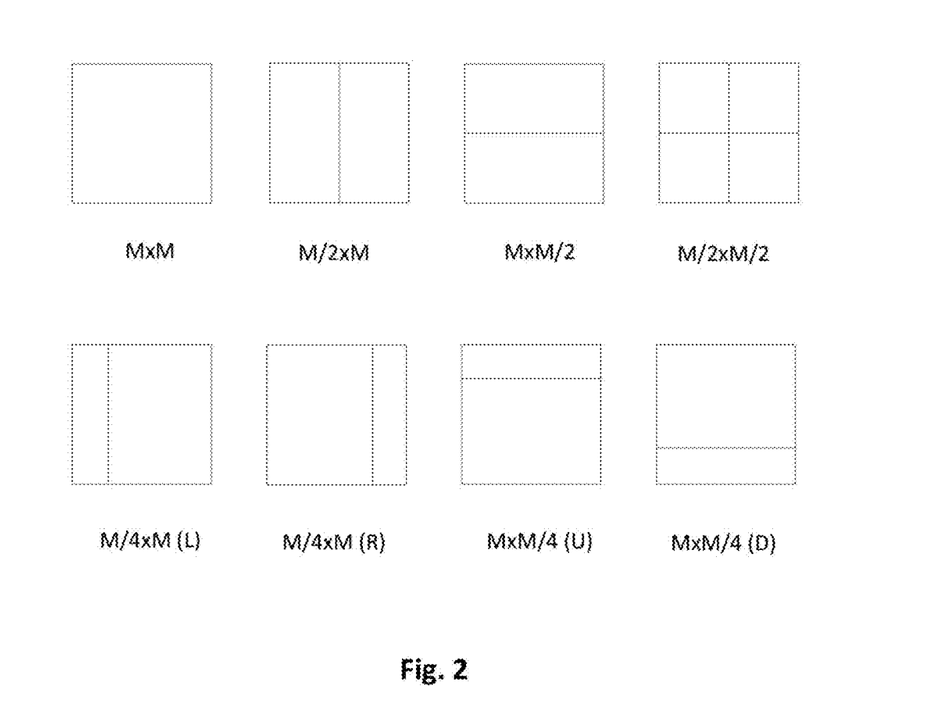
FIG. 2 illustrates eight different Prediction Unit (PU) partition types for splitting a CU into one or more PUs according to the HEVC standard.

The prediction decision is made at the CU level, where each CU is either coded by inter picture prediction or intra picture prediction. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. The dashed lines in FIG. 1 indicate TU boundaries. The TU is a basic representative block for applying transform and quantization on the residual signal in the encoding process. For each TU, a transform matrix having the same size as the TU is applied to the residual signal to generate the transform coefficients, and these transform coefficients are quantized and conveyed to the decoder on a TU basis. A transform unit is composed of a Transform Block (TB) of luma samples of size 8×8, 16×16, or 32×32, and two corresponding transform blocks of chroma samples in a picture coded according to a 4:2:0 color format. An integer transform is applied to a transform block and the level values of the quantized coefficients together with the other side information are entropy coded in the video bitstream.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

Joint Video Expert Team (JVET) of ITU-T SG16 WP3 and ISO/IEC JTC1/SC29/WG11 are currently in the process of establishing the next-generation video coding standard Versatile Video Coding (VVC). Some promising new coding tools have been adopted into VVC Working Draft (WD) 2. In VVC WD 2, each CTU can be partitioned into one or multiple smaller size CUs by a quadtree with nested Multi-Type Tree (MTT) using binary tree and ternary tree splitting. The resulting CU partitions and corresponding TU partitions can be in square or rectangular shapes.

BRIEF SUMMARY OF THE INVENTION

Methods and apparatuses of processing video data in a video coding system receive input data associated with a current transform block in a current video picture, determine if a size of the current transform block is a power of 4, determine a normalized quantization scaling factor or a normalized dequantization scaling factor according to whether the size of the current transform block is a power of 4, generate transform coefficient levels by applying a quantization processing to scaled transform coefficients in the current transform block or generating scaled transform coefficients by applying an inverse quantization processing to transform coefficient levels in the current transform block, and encode the current transform block or decode the current transform block. The quantization processing includes scaling the scaled transform coefficients by the normalized quantization scaling factor and the inverse quantization processing includes scaling the transform coefficient levels by the normalized dequantization scaling factor. The current transform block is split by a partitioning structure and the shape of the resulting blocks split by the partitioning structure is square or non-square.

The normalized dequantization scaling factor is equal to a multiplication of a dequantization scaling factor and a normalization scaling factor as the single scaling operation replaces cascade scaling operations of dequantization scaling and normalization scaling. In some embodiments, the normalized dequantization scaling factor is retrieved from a look-up table according to whether the size of the current transform block is a power of 4. The scaled transform coefficients of the current transform block are generated by multiplying the transform coefficient levels in the current transform block with the normalized dequantization scaling factor. The look-up table stores values of the normalized dequantization scaling factor corresponding to different quantization parameters for transform blocks with sizes equal to a power of 4 and the look-up table also stores values of the normalized dequantization scaling factor corresponding to different quantization parameters for transform blocks with sizes not equal to a power of 4.

In one embodiment, the scaled transform coefficients d [x] [y] are generated by multiplying the transform coefficient levels TransCoeffLevel [x] [y], a specified scaling list m [x] [y], and the normalized dequantization scaling factor levelScaleRectNorm [rectNormFlag] [qP % 6], where x and y represent a coordinate of a sample in the current transform block. The normalized dequantization scaling factor depends on a flag rectNormFlag indicating whether the size of the current transform block is a power of 4, and qP%6 is a remainder of the quantization parameter qP divided by 6. The scaled transform coefficients are further generated according to a variable bdShift, which is derived from a bit depth of the video data and the current transform block size.

In some embodiments of the present invention, a fixed-point computation is employed for generating the scaled transform coefficients of the current transform block, and a number of fractional bits for representing the normalized dequantization scaling factor is set to a predefined precision. An example of the predefined precision is set according to a number of fractional bits for dequantization scaling, and another example of the predefined precision is set according to a number of fractional bits for normalization scaling. For example, the predefined precision is set to 6 bits.

The normalized quantization scaling factor for encoding the current transform block may be determined by retrieving from a look-up table according to whether the size of the current transform block is a power of 4. The transform coefficient levels are generated by multiplying the scaled transform coefficients in the current transform block with the normalized quantization scaling factor. The look-up table stores values of the normalized quantization scaling factor corresponding to different quantization parameters for transform blocks with sizes equal to a power of 4 and values of the normalized quantization scaling factor corresponding to different quantization parameters for transform blocks with sizes not equal to a power of 4.

The step of determining if the size of the current transform block is a power of 4 determines whether the current transform block is square or non-square, and the current transform block is square when the size of the current transform block is a power of 4.

Aspects of the disclosure further provide an apparatus for the video coding system encoding or decoding video data by applying a quantization processing to scaled transform coefficients in a transform block or an inverse quantization processing to transform coefficient levels in a transform block, where the quantization processing scales the scaled transform coefficients by a normalized quantization scaling factor and the inverse quantization processing scales the transform coefficient levels by a normalized dequantization scaling factor. The normalized quantization scaling factor and the normalized dequantization scaling factor are depending on whether the size of the transform block is a power of 4.

Aspects of the disclosure further provide a non-transitory computer readable medium storing program instructions for causing a processing circuit of an apparatus to perform video coding process for quantization scaling of transform coefficients. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The coding blocks split by partitioning methods other than the quadtree partitioning method may not be all squares. For example, QuadTree plus Binary Tree (QTBT), binary tree, ternary tree, Multi-Type Tree (MTT) partitioning methods generate some rectangular shape coding blocks and thus corresponding transform blocks are also in rectangular shape. The DC gain of a transform block is not a power of 2 if the size of the transform block is not a power of 4. In this case, the values of transform coefficients and coded transform coefficient levels are scaled by a square root of 2 for normalization of the transform coefficient values, which is an undesirable scaling operation in view of computation. A scaling factor applied to scale coded transform coefficient levels of a transform block is inverse proportional to a square root of an area of the transform block. The area of the transform block is calculated by multiplying the width and height of the transform block, and the area is a power of 4 if the transform block is square. The scaling factor may be implemented by a right shift when the transform block is square because a square root of a power of 4 is a power of 2. However, a simple right shift is not applicable if the area of the transform block is not a power of 4.

An array d having nTbW elements in one row and nTbH elements in one column, contains elements d[x][y] representing scaled transform coefficients of a transform block, and these elements are derived from the coded transform coefficient level TransCoeffLevel[x][y] of the transform block as follows, where x=0 . . . nTbW−1 and y=0 . . . nTbH−1.

$$d[x][y]=(\text{TransCoeffLevel}[x][y]*m[x][y]*\text{levelScale}[qP\%6]*\text{rectNorm}+((1<<bd\text{Shift})>>1))>>bd\text{Shift} \quad \text{Equation (1)}$$

where m[x][y] is a specified scaling list, levelScale[ ] is specified as levelScale[k]={40, 45, 51, 57, 64, 72} with k=0 . . . 5 for dequantization scaling with respect to a specified quantization parameter qP. For example, when qP is 24, the remainder of qP divided by 6 is 0, levelScale [24%6]=40. The variables rectNorm and bdShift depend on whether a current transform block size is a power of 4, for example, when the current transform block size is not a power of 4, that is the current transform block is not square, the normalization scaling factor rectNorm is set equal to 181 and the shift value bdShift is increased by 8. The variables rectNormFlag, bdShift and rectNorm are derived as follows:

$$\text{rectNormFlag}=((\text{Log 2}(nTbW)+\text{Log 2}(nTbH))\&1)==1?1:0 \quad \text{Equation (2)}$$

$$bd\text{Shift}=\text{bitDepth}+\text{rectNormFlag}*8+(\text{Log 2}(nTbW)+\text{Log 2}(nTbH))/2)-5+\text{dep\_quant\_enabled\_flag} \quad \text{Equation (3)}$$

$$\text{rectNorm}=(\text{rectNormFlag}==1)?181:1 \quad \text{Equation (4)}$$

where Log 2(.) is the base-2 logarithm function and syntax dep_quant_enabled_flag is equal to 1 when dependent quantization is employed for generating the coded transform coefficient levels, otherwise dep_quant_enabled_flag is equal to 0. The values of the scaled transform coefficients d[x][y], coded transform coefficient levels TransCoeffLevel[x][y], specified scaling list m[x][y], dequantization scaling factor levelScale, and normalization scaling factor rectNorm are all integers. The number of fractional bits resulted from cascaded scaling by the dequantization scaling factor levelScale[qP % 6] and the normalization scaling factor rectNorm is equal to 14, including 6 fractional bits for levelScale[ ] and 8 fractional bits for rectNorm.

In exemplary embodiments of the present invention, cascaded scaling operations on the coded transform coefficient levels TransCoeffLevel[x][y] by the dequantization scaling factor and the normalization scaling factor are replaced by one single scaling operation with a normalized dequantization scaling factor. The normalized dequantization scaling factor is equal to a multiplication of the dequantization scaling factor and the normalization scaling factor. In some preferred embodiments, the values of the normalized dequantization scaling factors corresponding to different combinations of the dequantization scaling factors and the normalization scaling factor are pre-calculated and stored in a look-up table. Embodiments of the present invention can be employed for quantization or dequantization of the transform coefficients in a transform block with a DC gain not equal to a power of 2, in other words, processing the transform coefficients of a non-square transform block.

In some embodiments of generating scaled transform coefficients employed in a video coding system for coding the values of the transform coefficients, scaled transform coefficients in a transform block are derived by multiplying transform coefficient levels in the transform block, a normalized dequantization scaling factor, and a specified scaling list. For example, an array d of scaled transform coefficients for a transform block are derived from coded transform coefficient levels TransCoeffLevel[x][y] as follows:

$$d[x][y]=(\text{TransCoeffLevel}[x][y]*m[x][y]*\text{levelScaleRectNorm}[\text{rectNormFlag}][qP\%6]+((1<<bd\text{Shift})>>1))>>bd\text{Shift} \quad \text{Equation (5)}$$

The array d having nTbW elements in one row and nTbH elements in one column, which contains elements d[x][y], where x=0 . . . nTbW−1, y=0 . . . nTbH−1. The size of the current transform block is nTbW*nTbH, and x and y represent the coordinate of a sample in the current transform block. The variable m[x][y] is the specified scaling list. The variable levelScaleRectNorm [rectNormFlag][qP % 6] is the normalized dequantization scaling factor, which depends on a flag rectNormFlag and the remainder of the quantization parameter qP divided by 6. The flag rectNormFlag indicates whether the current transform block is a square block or a non-square block based on whether the current transform block size is a power of 4. The flag rectNormFlag equals to 0 when the current transform block is a square block and the flag equals to 1 when the current transform block is a non-square block. The variable bdShift is derived from a bit depth of the video data and the current transform block size as follows:

$$bd\text{Shift}=\text{bitDepth}+(\text{Log 2}(nTbW)+\text{Log 2}(nTbH))/2)-11+\text{RECT\_NORM\_FRAC\_BITS}+\text{dep\_quant\_enabled} \quad \text{Equation (6)}$$

where a constant REC_NORM_FRAC_BITS corresponds to a number of bits employed for representing a fractional part of the normalization scaling factor.

As mentioned earlier in the detailed description, the number of fractional bits for the dequantization scaling factor is 6 and the number of fractional bits for the normalization scaling factor is 8, and the number of fractional bits for scaling the transform coefficients of non-square transform blocks is 14 bits, which is an increment of 8 bits compared to that of in the square transform blocks. Different scaling precisions are therefore used for different transform block shapes. A fixed-point computation is employed for reconstructing decoded transform coefficients according to some embodiments of the present invention, a number of fractional bits for representing entry values of a look-up table can be reduced from the original precision to a predefined precision. The look-up table stores values of the pre-calculated normalized dequantization scaling factor or pre-calculated normalized quantization scaling factor. The number of fractional bits is reduced according to a number of fractional bits for dequantization scaling or a number of fractional bits for normalization scaling. For example, a video coding system uses the same number of fractional bits as those of the dequantization scaling factor. In this way, the number of fractional bits after the normalized dequantization scaling operation will not be increased by the normalization scaling operation for processing non-square TBs. In another example, a video coding system uses the same number of fractional bits as that of the normalization scaling factor. Normalization of transform coefficients can be processed in the same precision in this example.

Table 1 shows an example of the look-up table storing values of the normalized dequantization scaling factor levelScaleRectNorm[rectNormFlag][qP % 6] when the constant RECT_NORM_FRAC_BITS is equal to 6, and Table 2 shows an example of the look-up table for the normalized dequantization scaling factor when the constant RECT_NORM_FRAC_BITS is equal to 8. Tables 3 and 4 are examples of a look-up table storing values of normalized quantization scaling factors with 14 fractional bits for quantization of transform coefficients at an encoder. The values in Table 3 correspond to the normalized dequantization scaling factors in Table 1, and the values in Table 4 correspond to the normalized dequantization scaling factors in Table 2.

TABLE 1

| qP % 6 | 0 | 1 | 2 | 3 | 4 | 5 |
|---|---|---|---|---|---|---|
| rectNormFlag = 0 | 40 | 45 | 51 | 57 | 64 | 72 |
| rectNormFlag = 1 | 29 | 32 | 36 | 40 | 45 | 51 |

TABLE 2

| qP % 6 | 0 | 1 | 2 | 3 | 4 | 5 |
|---|---|---|---|---|---|---|
| rectNormFlag = 0 | 161 | 181 | 203 | 228 | 256 | 287 |
| rectNormFlag = 1 | 114 | 128 | 144 | 161 | 181 | 203 |

TABLE 3

| qP % 6 | 0 | 1 | 2 | 3 | 4 | 5 |
|---|---|---|---|---|---|---|
| rectNormFlag = 0 | 26214 | 23302 | 20560 | 18396 | 16384 | 14564 |
| rectNormFlag = 1 | 36158 | 32768 | 29127 | 26214 | 23302 | 20560 |

TABLE 4

| qP % 6 | 0 | 1 | 2 | 3 | 4 | 5 |
|---|---|---|---|---|---|---|
| rectNormFlag = 0 | 26052 | 23173 | 20662 | 18396 | 16384 | 14614 |
| rectNormFlag = 1 | 36792 | 32768 | 29127 | 26052 | 23173 | 20662 |

In an example of using 6 fractional bits to represent a normalized dequantization scaling factor (i.e. RECT_NORM_FRAC_BITS=6), by searching the look-up table as shown in Table 1, the normalized dequantization scaling factor is 45 for a square transform block and 32 for a non-square transform block when the quantization parameter is 1, 7, 13, 19, 25, 31, 37, 43, or 49 (qP % 6=1). At the corresponding encoder, when the quantization parameter is 1, 7, 13, 19, 25, 31, 37, 43, or 49, by searching the look-up table in Table 3, a corresponding normalized quantization scaling factor used for encoding the square transform block is 23302 and a corresponding normalized quantization scaling factor used for encoding the non-square block is 32768.

Embodiments of the present invention greatly reduce the computational complexity for performing quantization or dequantization on transform coefficients of non-square blocks. In some embodiments of employing a fixed-point computation, the computational complexity is further reduced by limiting the number of fractional bits for quantization scaling.

Figure 3:
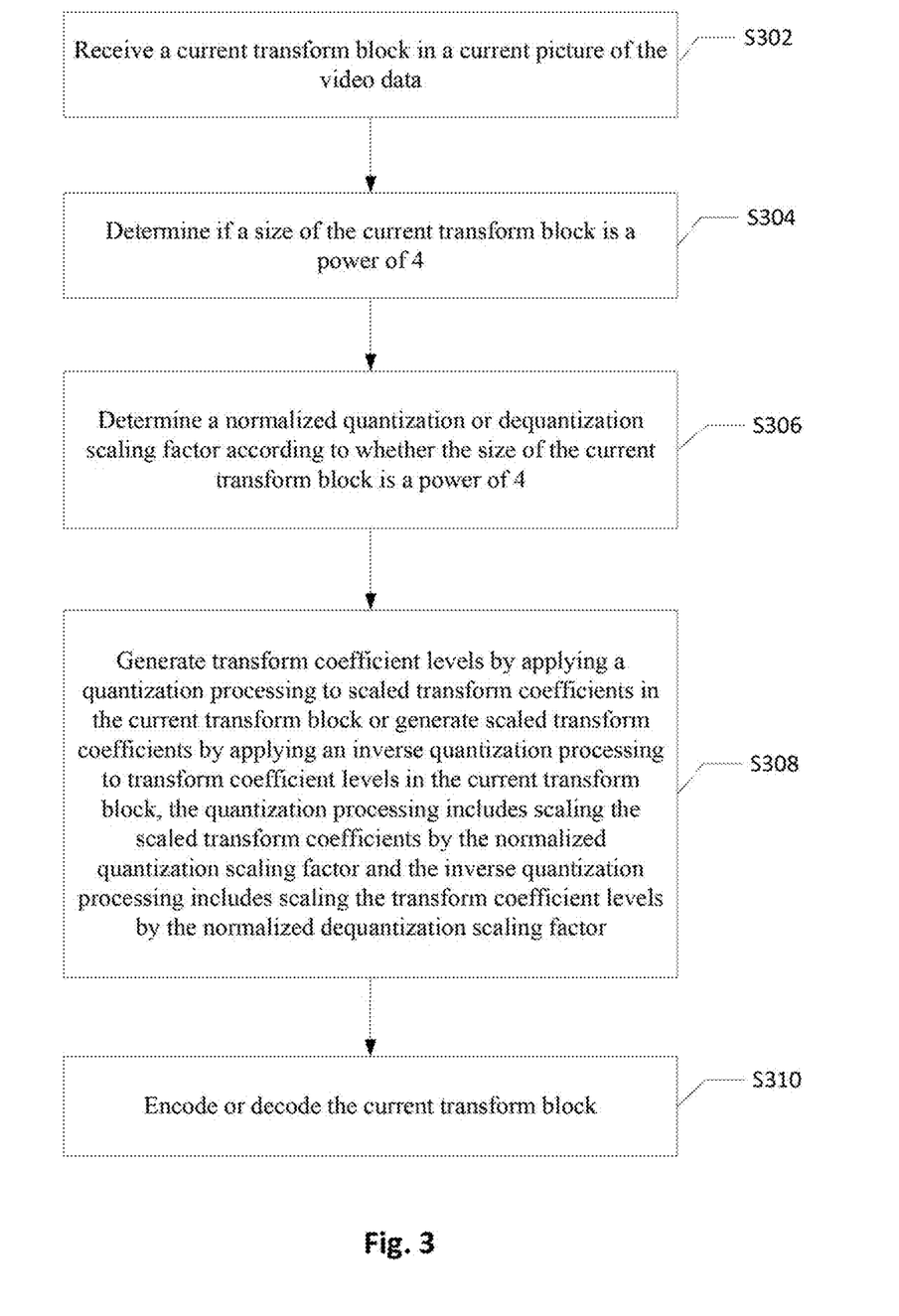
FIG. 3 is a flowchart illustrating embodiments of the present invention applying quantization scaling to transform coefficient levels in a current transform block.

FIG. 3 is a flowchart illustrating embodiments of the present invention processing a transform block in a video coding system. A current video picture or a current slice of video data is partitioned into non-overlapping blocks for video encoding or decoding. The video coding system receives input data associated with a current transform block in the current video picture or current slice in step S302. The input data includes scaled transform coefficients output from a transform module in a video encoding system or the input data includes coded transform coefficient levels parsed from a video bitstream by an entropy decoder in a video decoding system. The current transform block may be square or non-square, and the video coding system determines if a size of the current transform block is a power of 4 in step S304. For example, if a current transform block size is equal to a power of 4, the current transform block is a square block. In step S306, a normalized quantization scaling factor for encoding the current transform block is determined according to whether the size of the current transform block is a power of 4, or a normalized dequantization scaling factor for decoding the current transform block is determined according to whether the size of the current transform block is a power of 4. At a video encoding system, transform coefficient levels are generated by applying a quantization processing to scaled transform coefficients in the current transform block in step S308. At a video decoding system, scaled transform coefficients are generated by applying an inverse quantization processing to transform coefficient levels in the current transform block. The quantization processing comprises scaling the scaled transform coefficients by the normalized quantization scaling factor in the video encoding system and the inverse quantization processing comprises scaling the transform coefficient levels by the normalized dequantization scaling factor in the video decoding system. In step S310, the current transform block is encoded or the current transform block is decoded. In an embodiment of step S306, the normalized quantization scaling factor or the normalized dequantization scaling factor is retrieved from a look-up table according to whether the size of the current transform block is a power of 4 and according to a value of a quantization parameter for quantization or dequantization the current transform block.

Figure 4:
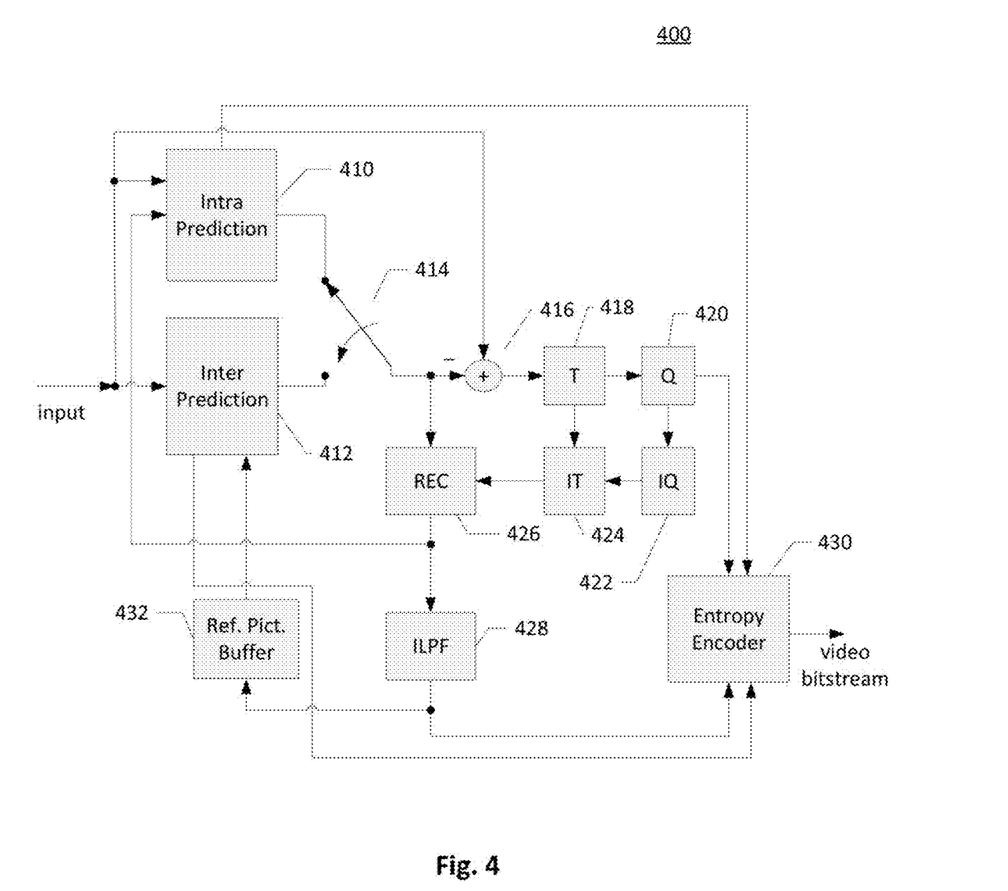
FIG. 4 illustrates an exemplary system block diagram for a video encoding system incorporating the video data processing method according to embodiments of the present invention.

FIG. 4 illustrates an exemplary system block diagram for a Video Encoder 400 implementing embodiments of the present invention. Intra Prediction module 410 provides intra predictors based on reconstructed video data of a current picture. Inter Prediction module 412 performs motion estimation (ME) and motion compensation (MC) to provide predictors based on referencing video data from other picture or pictures. Either Intra Prediction module 410 or Inter Prediction module 412 supplies the selected predictor to Adder 416 to form residues. The residues of the current block are further processed by Transformation module (T) 418 followed by Quantization module (Q) 420. Quantization module 420 receives scaled transform coefficients of each transform block from Transformation module 418, and scales the scaled transform coefficients. An embodiment of the Quantization module stores normalized quantization scaling factors correspond to different quantization parameters for transform blocks with sizes equal to a power of 4 and for transform blocks with sizes not equal to a power of 4 in a look-up table. The scaled transform coefficients in a current transform block are scaled by multiplying with a normalized quantization scaling factor searched from the look-up table to generate transform coefficient levels. The transform coefficient levels of the current transform block are generated by applying a quantization processing according to the quantization parameter of the current transform block. The transformed and quantized residual signal is then encoded by Entropy Encoder 430 to form a video bitstream. The video bitstream is then packed with side information. The transformed and quantized residual signal of the current block is processed by Inverse Quantization module (IQ) 422 and Inverse Transformation module (IT) 424 to recover the prediction residues. IQ module scales coded transform coefficient levels in a single scaling operation to generate scaled transform coefficients. As shown in FIG. 4, the residues are recovered by adding back to the selected predictor at Reconstruction module (REC) 426 to produce reconstructed video data. The reconstructed video data may be stored in Reference Picture Buffer (Ref. Pict. Buffer) 432 and used for prediction of other pictures. The reconstructed video data from REC module 426 may be subject to various impairments due to the encoding processing, consequently, In-loop Processing Filter (ILPF) 428 is applied to the reconstructed video data before storing in the Reference Picture Buffer 432 to further enhance picture quality. Syntax elements are provided to Entropy Encoder 430 for incorporation into the video bitstream.

Figure 5:
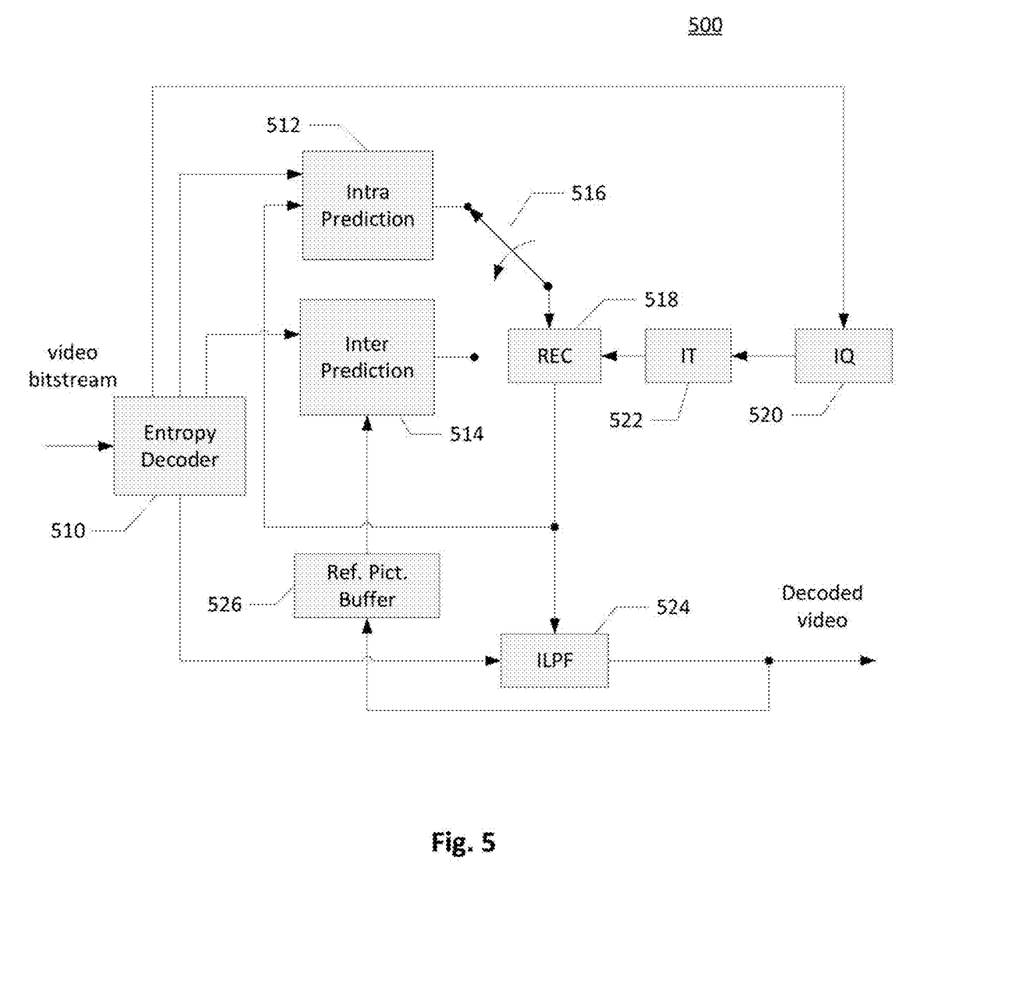
FIG. 5 illustrates an exemplary system block diagram for a video decoding system incorporating the video data processing method according to embodiments of the present invention.

A corresponding Video Decoder 500 for decoding the video bitstream generated by the Video Encoder 400 of FIG. 4 is shown in FIG. 5. The video bitstream is the input to Video Decoder 500 and is decoded by Entropy Decoder 510 to parse and recover the transformed and quantized residual signal and other system information. Entropy Decoder 510 parses coded transform coefficient levels of a current transform block. The decoding process of Decoder 500 is similar to the reconstruction loop at Encoder 400, except Decoder 500 only requires motion compensation prediction in Inter Prediction module 514. Each block is decoded by either Intra Prediction module 512 or Inter Prediction module 514. Switch 516 selects an intra predictor from Intra Prediction module 512 or Inter predictor from Inter Prediction module 514 according to decoded mode information. The transformed and quantized residual signal is recovered by Inverse Quantization module (IQ) 520 and Inverse Transformation module (IT) 522. Inverse Quantization module 520 generates scaled transform coefficients by scaling the coded transform coefficient levels in the current transform block by a normalized dequantization scaling factor, and applies inverse quantization processing according to a quantization parameter of the current transform block to generate the scaled transform coefficients. The recovered residual signal is reconstructed by adding back the predictor in REC module 518 to produce reconstructed video. The reconstructed video is further processed by In-loop Processing Filter (ILPF) 524 to generate final decoded video. If the currently decoded picture is a reference picture, the reconstructed video of the currently decoded picture is also stored in Ref Pict. Buffer 526 for later pictures in decoding order.

Various components of Video Encoder 400 and Video Decoder 500 in FIG. 4 and FIG. 5 may be implemented by hardware components, one or more processors configured to execute program instructions stored in a memory, or a combination of hardware and processor. For example, a processor executes program instructions to control receiving of input data associated with a current transform block. The processor is equipped with a single or multiple processing cores. In some examples, the processor executes program instructions to perform functions in some components in Encoder 400 and Decoder 500, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 4 and 5, Encoder 400 and Decoder 500 may be implemented in the same electronic device, so various functional components of Encoder 400 and Decoder 500 may be shared or reused if implemented in the same electronic device. For example, one or more of Reconstruction 426, Inverse Transformation 424, Inverse Quantization 422, In-loop Processing Filter 428, and Reference Picture Buffer 432 in FIG. 4 may also be used to function as Reconstruction 518, Inverse Transformation 522, Inverse Quantization 520, In-loop Processing Filter 524, and Reference Picture Buffer 526 in FIG. 5, respectively.

Embodiments of the video data processing method applying quantization scaling for square or non-square blocks in a video coding system may be implemented in a circuit integrated into a video compression chip or program code integrated into video compression software to perform the processing described above. For examples, scaling transform coefficient levels in a current transform block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding or decoding video data in a video coding system, comprising:
   receiving input data associated with a current transform block in a current video picture;
   determining if a size of the current transform block is a power of 4;
   determining a normalized quantization scaling factor for encoding the current transform block or determining a normalized dequantization scaling factor for decoding the current transform block according to whether the size of the current transform block is a power of 4;
   generating transform coefficient levels by applying a quantization processing to scaled transform coefficients in the current transform block or generating scaled transform coefficients by applying an inverse quantization processing to transform coefficient levels in the current transform block, wherein the quantization processing comprises scaling the scaled transform coefficients by the normalized quantization scaling factor and the inverse quantization processing comprises scaling the transform coefficient levels by the normalized dequantization scaling factor; and encoding the current transform block or decoding the current transform block.

2. The method of claim 1, wherein the normalized dequantization scaling factor is equal to a multiplication of a dequantization scaling factor and a normalization scaling factor.

3. The method of claim 1, wherein the step of determining a normalized dequantization scaling factor further comprises retrieving the normalized dequantization scaling factor from a look-up table according to whether the size of the current transform block is a power of 4, and the step of generating scaled transform coefficients comprises multiplying the transform coefficient levels in the current transform block with the normalized dequantization scaling factor.

4. The method of claim 3, wherein the look-up table stores values of the normalized dequantization scaling factor corresponding to different quantization parameters for transform blocks with sizes equal to a power of 4 and values of the normalized dequantization scaling factor corresponding to different quantization parameters for transform blocks with sizes not equal to a power of 4.

5. The method of claim 1, wherein the scaled transform coefficients d [x] [y] are generated by multiplying the transform coefficient levels TransCoeffLevel [x] [y], a specified scaling list m [x] [y], and the normalized dequantization scaling factor levelScaleRectNorm [rectNormFlag] [qP % 6], wherein x and y represent a coordinate of a sample in the current transform block, rectNormFlag is a flag indicating whether the size of the current transform block is a power of 4, and qP % 6 is a remainder of a quantization parameter qP divided by 6.

6. The method of claim 5, wherein the scaled transform coefficients d [x] [y] are generated by: d[x][y]=(TransCoeffLevel[x][y]*m[x][y]*levelScaleRectNorm [rectNormFlag][qP % 6]+((1<<bdShift)>>1))>>bdShift, wherein a variable bdShift is derived from a bit depth of the video data and the current transform block size.

7. The method of claim 1, wherein a fixed-point computation is employed for generating the scaled transform coefficients of the current transform block, wherein a number of fractional bits for representing the normalized dequantization scaling factor is set to a predefined precision.

8. The method of claim 7, wherein the predefined precision is set according to a number of fractional bits for dequantization scaling.

9. The method of claim 7, wherein the predefined precision is set according to a number of fractional bits for normalization scaling.

10. The method of claim 7, wherein the predefined precision is set to 6 bits.

11. The method of claim 1, wherein the step of determining normalized quantization scaling factor further comprises retrieving the normalized quantization scaling factor from a look-up table according to whether the size of the current transform block is a power of 4, and the step of generating transform coefficient levels comprises multiplying the scaled transform coefficients in the current transform block with the normalized quantization scaling factor.

12. The method of claim 11, wherein the look-up table stores values of the normalized quantization scaling factor corresponding to different quantization parameters for transform blocks with sizes equal to a power of 4 and values of the normalized quantization scaling factor corresponding to different quantization parameters for transform blocks with sizes not equal to a power of 4.

13. The method of claim 1, wherein the step of determining if the size of the current transform block is a power of 4 determines whether the current transform block is square or non-square.

14. An apparatus for performing video coding, comprising: a computer processor configured for receiving video data; and programming executable on the computer processor for video coding by performing steps comprising:

receiving input data associated with a current transform block in a current video picture;

determining if a size of the current transform block is a power of 4;

determining a normalized quantization scaling factor for encoding the current transform block or determining a normalized dequantization scaling factor for decoding the current transform block according to whether the size of the current transform block is a power of 4;

generating transform coefficient levels by applying a quantization processing to scaled transform coefficients in the current block or generating scaled transform coefficients by applying an inverse quantization processing to transform coefficient levels in the current transform block, wherein the quantization processing comprises scaling the scaled transform coefficients by the normalized quantization scaling factor and the inverse quantization processing comprises scaling the transform coefficient levels by the normalized dequantization scaling factor; and encoding the current transform block or decoding the current transform block.

15. A non-transitory computer readable medium storing program instruction causing a processing circuit of an apparatus to perform video coding method, and the method comprising:

receiving input data associated with a current transform block in a current video picture;

determining if a size of the current transform block is a power of 4;

determining a normalized quantization scaling factor for encoding the current transform block or determining a normalized dequantization scaling factor for decoding the current transform block according to whether the size of the current transform block is a power of 4;

generating transform coefficient levels by applying a quantization processing to scaled transform coefficients in the current transform block or generating scaled transform coefficients by applying an inverse quantization processing to transform coefficient levels in the current transform block, wherein the quantization processing comprises scaling the scaled transform coefficients by the normalized quantization scaling factor and the inverse quantization processing comprises scaling the transform coefficient levels by the normalized dequantization scaling factor when decoding the current transform block; and encoding the current transform block or decoding the current transform block.

* * * * *